United States Patent [19]

Klibert et al.

[11] Patent Number: 4,941,698
[45] Date of Patent: Jul. 17, 1990

[54] CHAIN LIFTING PLATE

[75] Inventors: Jeffrey M. Klibert, Lancaster; Stephen S. Kleinert, Ephrata, both of Pa.; Robert L. Bennett, Humble, Tex.

[73] Assignee: Lift-All Company, Inc., Manheim, Pa.

[21] Appl. No.: 290,631

[22] Filed: Dec. 27, 1988

[51] Int. Cl.⁵ ............................................. B66C 1/10
[52] U.S. Cl. ............................. 294/82.12; 24/116 R; 59/93
[58] Field of Search ............... 294/1.1, 74, 81.2, 81.3, 294/81.56, 82.1–82.13; 24/115 H, 116 R, 116 A, 129 R, 129 A, 129 B, 230.5 R, 230.5 AD, 230.5 TP; 59/84, 85, 90, 91, 93

[56] References Cited

U.S. PATENT DOCUMENTS

| | | | |
|---|---|---|---|
| 569,448 | 10/1896 | Dudley | 294/82.12 |
| 1,326,969 | 1/1920 | Rounds | 294/82.12 |
| 2,356,146 | 8/1944 | Caldwell | 294/82.12 |
| 2,583,320 | 1/1952 | Brummel | 294/82.1 |
| 2,721,757 | 10/1955 | Anderson | 294/81.56 X |
| 2,820,661 | 1/1958 | Koons | 294/82.12 |
| 2,835,528 | 5/1958 | McCarthy | 294/82.12 |
| 3,335,468 | 8/1967 | Harley | 24/116 R |
| 3,486,783 | 12/1969 | Allen | 294/74 |
| 4,060,269 | 11/1977 | Rieger | 294/82.12 |
| 4,176,874 | 12/1979 | Archer | 294/82.12 |
| 4,241,575 | 12/1980 | St. Germain | 294/82.12 |
| 4,248,469 | 2/1981 | Knox | 294/82.12 |

FOREIGN PATENT DOCUMENTS

| | | | |
|---|---|---|---|
| 1404546 | 5/1965 | France | 294/82.12 |
| 438601 | 8/1974 | U.S.S.R. | 294/82.11 |
| 870578 | 6/1961 | United Kingdom | 294/82.1 |
| 955824 | 4/1964 | United Kingdom | 294/82.12 |
| 1135182 | 12/1968 | United Kingdom | 294/82.12 |

Primary Examiner—Johnny D. Cherry
Attorney, Agent, or Firm—Martin Fruitman

[57] ABSTRACT

A lifting plate for chains. A simple plate with three separate openings. A center opening has a rounded shape, is high on the plate and has a narrow slot extending down the plate centerline to form a balloon-like outline. The other two smaller openings have wide upper portions with narrow slots extending downward and are located in a balanced configuration on either side of the lower slot of the larger hole. The upper parts of the smaller holes are sized too small to permit the chain end hooks to freely pass through, but they are located closed enough to the edge of the plate to permit the hooks to be moved through the holes by twisting them through. The three holed configuration permits creating double chain slings with different lengths of chain in each leg and storing the excess chain between the holes.

3 Claims, 1 Drawing Sheet

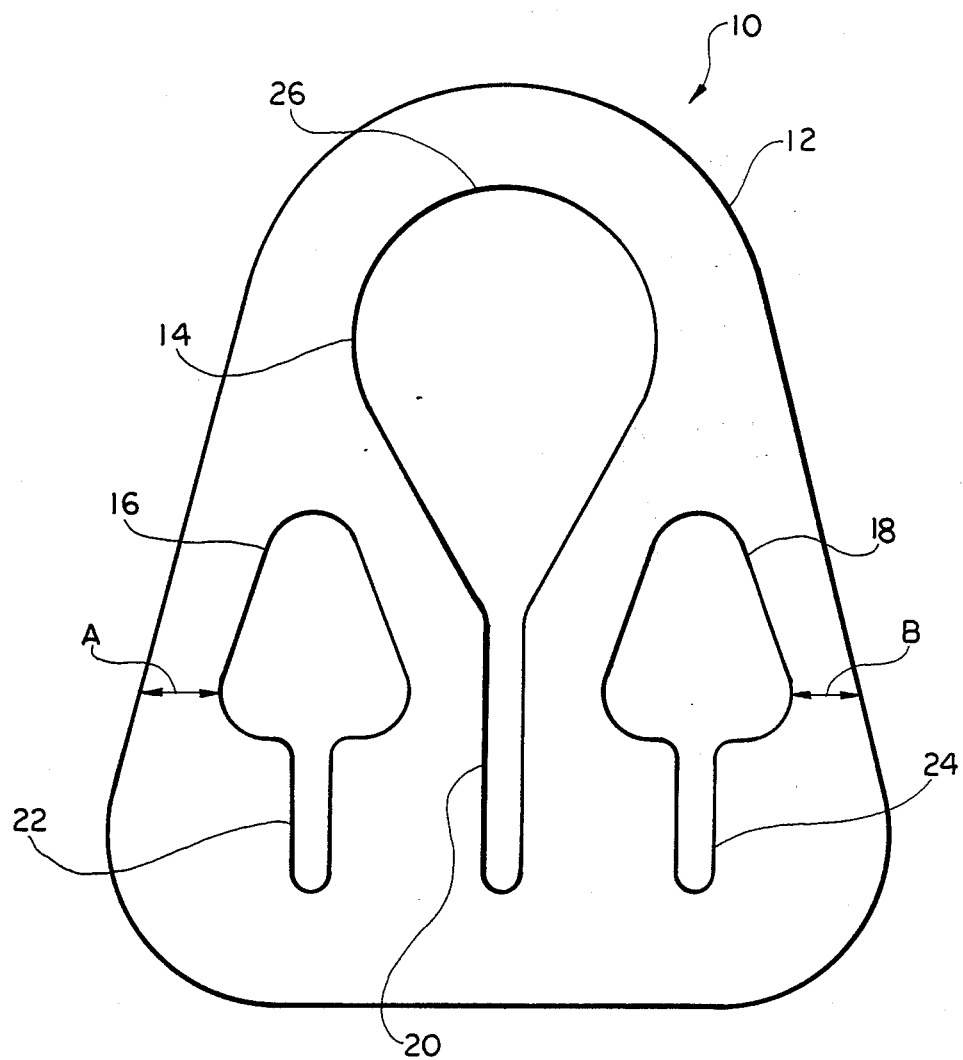

CHAIN LIFTING PLATE

SUMMARY OF THE INVENTION

This invention deals generally with handling and hoist line instruments and more specifically with hoist lines which have a center of gravity adjustment.

One particular type of chain sling is a chain sling which has two or more chains of different lengths which are also adjustable in some manner. This adjustment has typically been accomplished by using other adjacent chains with hooks into which links of a longer chain can be inserted to shorten the longer chain. Unfortunately, this not only requires an additional chain for each one to be utilized but it also adds an extra hook for every chain in use. Clearly this adds a great deal of extra cost and weight to each lifting sling.

One other type of adjustable chain sling is one in which a chain with two large end fittings is fitted through a hole in a plate through which the end fittings cannot pass. A slot in the hole in the plate permits any link of the chain to be locked in place at the plate, thereby permitting one leg of the chain to be lengthened as the other is shortened. However, this furnishes only limited adjustment and is also limited to a sling with only two lengths of chain.

The present invention extends the versatility of chain slings by permitting the use of multiple chains and also allowing virtually unlimited adjustment. The present invention uses a plate with three holes to furnish independent individual chain adjustment and convenient storage of excess chain. Unlike the results of previously available chain slings, the individual chain adjustment permits balancing loads with the use of only one chain sling. Prior systems required the use of multiple slings to balance loads. Moreover, the present invention has uniquely shaped holes which, while permitting the removal of chains from the plate by passing the end fitting through the holes, prevents accidental release of the end fitting.

All this is accomplished by using a three hole plate with the holes having special shapes. All three holes have chain capturing slots, but their upper portions have shapes to fulfill particular purposes. The locations of the lower holes are also critical to attain selective passage of the end fittings through these holes.

The preferred embodiment of the invention uses a plate with an approximately trapezoidal shape, but with rounded corners. Its large hole is centered between the sides of the plate, and has a chain locking slot extending from the bottom of a teardrop shaped hole which starts near the top of the plate. The top of this hole is rounded in the conventional manner to permit hanging the plate and its associated chains from a typical crane hook. The slot extends down from the center of the bottom of the teardrop and is sized so that it accepts a chain link when the link is oriented vertically, but it is too narrow to permit the adjacent links to pass through it since they are positioned in a different plane. The upper part of the large hole is constructed to be large enough for all links of the chain, and the end fittings to pass through it freely.

The two smaller holes on the plate are positioned in a balanced configuration on either side of the lower portion of the centered larger hole. Each of these two smaller holes also has a chain locking slot extending down from a larger portion at the top. These chain locking slots are sized, as are all such slots, to capture one link in its planar orientation and to prevent the adjacent links which are oriented in different planes from moving through the slot.

The two smaller holes also have a unique size and specific locations. The part of each of these holes which is above the chain locking slot is specifically sized so that it is too small to have the chain end hooks pass through it freely. Nevertheless, by properly positioning these small upper sections of the holes, it is possible to allow the end hooks to pass through the holes with the proper motion. The key to this action is that the spacing between the edge of the plate and the upper part of the smaller hole must be less than the span of the hook, so that the end hook can wrap around the solid part of the plate separating the hole and the edge of the plate and thereby fit through the hole.

When a lifting plate contains the features prescribed for the present invention, such as the three holes with chain locking slots, with the smaller holes being on either side of the larger hole and the smaller holes being close to the side edges of the plate, it can function to permit multiple adjustable chain lengths, prevent accidental removal of the chains from the plate and still allow the chains to be inserted or removed if necessary.

For instance, with such a plate, one chain can be inserted through both small holes and be locked into their slots with different lengths and the excess chain can be looped between the slots. Moreover, two chains can be inserted with one through each small hole and each with different lengths, but with their unused ends stored in the center slot.

The present invention therefore furnishes a compact lifting plate which yields greater versatility than previously available, and does so with increased safety.

BRIEF DESCRIPTION OF THE DRAWING

The FIGURE is a front view of the preferred embodiment of the invention.

DETAILED DESCRIPTION OF THE INVENTION

The preferred embodiment of the invention is shown in the FIGURE in a front view, in which lifting plate 10 is formed from plate 12 into which are cut center hole 14 and lower holes 16 and 18. Center hole 12 has long slot 20 extending downward along the centerline of plate 12, and lower hole 16 and lower hole 18 each has a slot, 22 and 24 respectively, extending down from it.

Center hole 14 is large enough so that any chain or end fitting which is to be used with lifting plate 10 can easily pass through it. Therefore, center hole 14 can be used as a conventional adjustment for a single chain whereby one leg of a chain is shortened as the balance of the chain on the other side of plate 12 is lengthened.

All of the slots 20, 22 and 24 operate as chain locking slots in the same manner. When a single link of a chain is inserted into a slot, the sides of the slot rest against the sides of the link so that the link is held in an orientation in which its loop is in a plane parallel to the sides of the slot. The adjacent links of the chain, which by the very nature of a chain, are generally oriented in planes transverse to the link which is between them and in the slot, are held crosswise to the slot and cannot pass through it. The position of the chain is therefore locked in relationship to the slot, and therefore also in regard to plate 12. Thus, any time a chain is moved relative to plate 12 it is first lifted up out of the slot of the hole with which it is associated, then it is moved through the hole and replaced back into the slot to fix its position once more.

While center hole 14 is constructed to be large enough for the end fittings of the chains to easily pass through it, lower holes 16 and 18 are purposely sized small so that the chain end hooks can not easily go through them. This prevents the accidental detachment of a chain from plate 12. Lower holes 16 and 18 are dimensioned so that the chain links can pass through them, but are limited in size so that the end hooks will not. Nevertheless, the boundaries of holes 16 and 18 are located close enough to the sides of plate 12 that the end hook of the chains with which lifting plate 10 is used will be able to be worked around the part of the plate between holes 16 and 18 and the edge of plate 12, and thereby be passed through the holes. Dimensions A and B in the FIGURE must therefore be less than the span of any hook on a chain with which lifting plate 10 is to be used if that hook is to be passed through the hole associated with the particular dimension.

As shown in the FIGURE the preferred location of holes 16 and 18 is that they be balanced around the centerline of plate 12. This configuration permits holes 16 and 18 to work together to balance a load. The particular hole shapes of the preferred embodiment of the FIGURE are a result of minimizing the overall size of plate 12 and increasing the versatility of lifting plate 10.

For instance, slot 20 is constructed to be long enough to hold two chain links stacked one on top of the other, and the teardrop shape of the lower portion of hole 14 along with the slanted inside edges of holes 16 and 18 permit holes 16 and 18 to be brought in closer to the centerline of plate 12. Top 26 of hole 14 is of course conventionally rounded to permit lifting plate 10 to be hung on a standard crane hook.

As described previously, this combination of features makes lifting plate 10 particularly versatile because it is usable with multiple chains and in multiple configurations, and also, because chains cannot inadvertently slip out of holes 16 and 18, it is also particularly safe.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, the shape of plate 12 or of holes 14, 16 and 18 could be changed as long as the dimensional restrictions are maintained. Moreover, plate 12 may be made in any suitable thickness, the thickness being determined by the material used and the strength required for the particular application.

What is claimed as new and for which Letters Patent of the United States are desired to be secured are:

1. A chain lifting plate for use with a chain which has multiple links and hook-shaped end fittings, the chain lifting plate comprising:

a plate with an upper edge, a lower edge, two side edges and at least three holes;

a first hole being located equidistant from the side edges of the plate and having a larger upper portion nearer to the upper edge of the plate with a slot extending down from the upper portion, the slot being located equidistant from the side edges of the plate and being of a width greater than the thickness of the links of a chain with which the chain lifting plate is used, and the upper portion of the first hole being rounded to accept a crane hook;

second and third holes located on the plate in balanced location on both sides of the first hole, the second and third holes each having a larger upper portion nearer to the upper edge of the plate with a slot extending down from the upper portion, the slot being of a width greater than the thickness of links of a chain with which the chain lifting plate is used, the larger upper portion being too small to freely pass through it an end hook of a chain with which the lifting plate is used, and the upper portions of the second and third holes being located close enough to a side edge of the plate so that an end hook of a chain used with the plate can be hooked around the plate dimension between the upper portion of each hole and a plate side edge in order to move an end hook through the hole.

2. The chain lifting plate of claim 1 wherein the slot of the first hole is long enough to hold at least two links of a chain used with the lifting plate.

3. The chain lifting plate of claim 1 wherein the upper portion of the first hole is large enough for end fittings of a chain used with the lifting plate to pass freely through the hole.

* * * * *